United States Patent
Wilson

(10) Patent No.: US 12,455,733 B2
(45) Date of Patent: Oct. 28, 2025

(54) PATCHING FOR CLOUD-BASED 5G NETWORKS

(71) Applicant: DISH Wireless L.L.C., Englewood, CO (US)

(72) Inventor: Steven Wilson, Englewood, CO (US)

(73) Assignee: DISH Wireless L.L.C., Englewood, CO (US)

( * ) Notice: Subject to any disclaimer, the term of this patent is extended or adjusted under 35 U.S.C. 154(b) by 261 days.

(21) Appl. No.: 18/186,368

(22) Filed: Mar. 20, 2023

(65) Prior Publication Data

US 2023/0359453 A1    Nov. 9, 2023

Related U.S. Application Data

(60) Provisional application No. 63/338,145, filed on May 4, 2022.

(51) Int. Cl.
*G06F 8/65*    (2018.01)
*G06F 9/48*    (2006.01)

(52) U.S. Cl.
CPC .............. *G06F 8/65* (2013.01); *G06F 9/4881* (2013.01); *G06F 2209/486* (2013.01)

(58) Field of Classification Search
CPC .............. G06F 8/60–66; G06F 9/4881; G06F 2209/486; G06F 2221/033
USPC .................................................. 717/168–178
See application file for complete search history.

(56) References Cited

U.S. PATENT DOCUMENTS

| | | | |
|---|---|---|---|
| 2016/0092210 A1* | 3/2016 | Kuchibhotla | G06F 8/61 717/121 |
| 2018/0253294 A1* | 9/2018 | Kelly | H04W 4/21 |
| 2019/0349428 A1* | 11/2019 | Kovacheva | G06F 8/65 |
| 2022/0050674 A1* | 2/2022 | Liljeback | G06F 8/60 |

FOREIGN PATENT DOCUMENTS

DE    102021125851 A1 *  5/2022  .......... G06F 11/0766

OTHER PUBLICATIONS

Le, Duy, et al., Shadow patching: Minimizing maintenance windows in a virtualized enterprise environment, 10th International Conference on Network and Service Management (CNSM) and Workshop, Nov. 2014, 6 pages, [retrieved on Jul. 29, 2025], Retrieved from the Internet: < URL:http://ieeexplore.ieee.org/>.*

* cited by examiner

*Primary Examiner* — Geoffrey R St Leger
(74) *Attorney, Agent, or Firm* — KW Law, LLP

(57) ABSTRACT

An automated patching system for a cloud-based network includes an instance of a network function running on cloud-based hardware. An agent retrieves a baseline and a list of installed software for the instance. A patching function is in communication with the agent and runs at a first scheduled time in response to a first maintenance window starting at the first scheduled time. The first maintenance window comprises a first target list of instances running in a first availability zone. The patching function also runs at a second scheduled time in response to a second maintenance window. The patching function polls the agent to add the instance to the first target list of the first maintenance window. A first task launched by the patching function runs a patching executable that applies a patch to the instance in response to the patch missing from the list of installed software.

19 Claims, 3 Drawing Sheets

PATCHING FOR CLOUD-BASED 5G NETWORKS

CROSS-REFERENCE TO RELATED APPLICATIONS

This application claims priority to U.S. Provisional Application No. 63/338,145 filed on May 4, 2022 and entitled "PATCHING FOR CLOUD-BASED 5G NETWORKS," which is incorporated herein by reference.

TECHNICAL FIELD

The following discussion generally relates to patching, and in particular to patching components of cloud-based systems.

BACKGROUND

Modern computing systems rely on regular patching to counteract newly discovered vulnerabilities. Vulnerabilities may be identified and published at different times for different systems and applications. For example, a newly discovered Windows vulnerability is often not a vulnerability of iOS. Vulnerabilities also have varying severity levels. Some may merit immediate remediation, while others having lower risk of exploitation or lower levels of potential harm may be suitable for patching on in due course. Various systems and applications thus ripen for patching on different timelines.

As computing systems become larger both in terms of number and type of computing assets, patching can become unwieldy. Cloud-based systems in particular may merit patching to many different types of assets at different times as virtual assets are rapidly commissioned and decommissioned in different locations. Patching in a cloud-based 5G network, for example, is applied to numerous virtual assets that are constantly being commissioned and retired.

SUMMARY

Various embodiments manage automatic patch deployment on a cloud-based network. An automated process for patching in a cloud-based environment creates a first maintenance window for execution at a first scheduled time. The first maintenance window includes a first target list of instances running in a first availability zone. A second maintenance window is created for execution at a second scheduled time. The second maintenance window comprises a second target list of instances running in a second availability zone. A patching function is invoked in response to the first maintenance window running at the first scheduled time. The patching function creates a task to run a patching executable to apply a patch to a first instance from the first target list during the first maintenance window.

In various embodiments, the process further includes the steps of launching the patching function in response to the second maintenance window running at the second scheduled time, and creating a second task to run a second patching executable to apply a second patch to a second instance from the second target list. The patch is identified as missing from the first instance by comparing a list of installed patches on the first instance to a baseline associated with the first instance, with the patch being missing in response to being present on the baseline but absent from the list of installed patches. The patching function creates a second task to update the first target list of instances running in the first availability zone. The patching function may also create a task to update a next launch time for the first maintenance window. The patching function creates the first maintenance window and the second maintenance window in response to the first maintenance window and the second maintenance window being undetected. The patching function may retrieve a set of target instances by querying managed instances in response to detecting that the first target list is empty. The patching function filters the set of target instances based on tags associated with each instance in the set of target instances to generate a set of filtered instances. The patching function may also add the set of filtered instances to the first target list in response to the filtered instances running in the first availability zone.

An embodiment of a process for patching in a cloud-based environment includes the steps of creating a first maintenance window for execution at a first scheduled time, querying a plurality of agents to identify a plurality of active instances, filtering the active instances in response to tags associated with the active instances to identify a plurality of filtered instances, and adding the filtered instances to the list of target instances. The first maintenance window includes a list of target instances. A patching function is invoked in response to the first maintenance window running at the first scheduled time. The patching function creates a task to run a patching executable that applies a patch to a first instance from the list of target instances in response to the patch being undetected on the first instance.

In various embodiments, the process includes the step of launching the patching function in response to a second maintenance window running at a second scheduled time. The second scheduled time differs from the first scheduled time. The patching function creates a second task to run a second patching executable to apply a missing patch to a second instance from a second target list. The patch is undetected on the first instance in response to appearing on a baseline associated with the first instance but not on a list of installed patches on the first instance. The patching function may create a task to update a next launch time for the first maintenance window. The patching function may also create the first maintenance window and a second maintenance window in response to the first maintenance window and the second maintenance window being undetected. The patching function retrieves a set of target instances by querying managed instances in response to detecting that the list of target instances is empty. The patching function filters the set of target instances based on tags associated with each instance in the set of target instances to generate a set of filtered instances. The set of filtered instances is added to the list of target instances in response to the filtered instances running in a first availability zone.

An embodiment of an automated patching system for a cloud-based network includes an instance of a network function running on cloud-based hardware. An agent is associated with the instance and configured to retrieve a baseline for the instance and a list of installed software on the instance. A patching function runs on cloud-based hardware and is in communication with the agent. The patching function runs at a first scheduled time in response to a first maintenance window starting at the first scheduled time. The first maintenance window comprises a first target list of instances running in a first availability zone. The patching function also runs at a second scheduled time in response to a second maintenance window starting at the second scheduled time. The patching function polls the agent to add the instance to the first target list of the first maintenance window. A first task launched by the patching function runs a patching executable that applies a patch to the instance from the first target list during the first maintenance window. The first task applies the patch in response to the patch being present on the baseline and absent from the list of installed software on the instance.

In various embodiments, the patching function launches in response to the second maintenance window running at the second scheduled time. The patching function creates a second task to run a second patching executable that applies a second patch to a second instance from a second target list of the second maintenance window. The patching function may create a second task to update the first target list of instances running in the first availability zone.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the illustrations.

DETAILED DESCRIPTION

Figure 1:
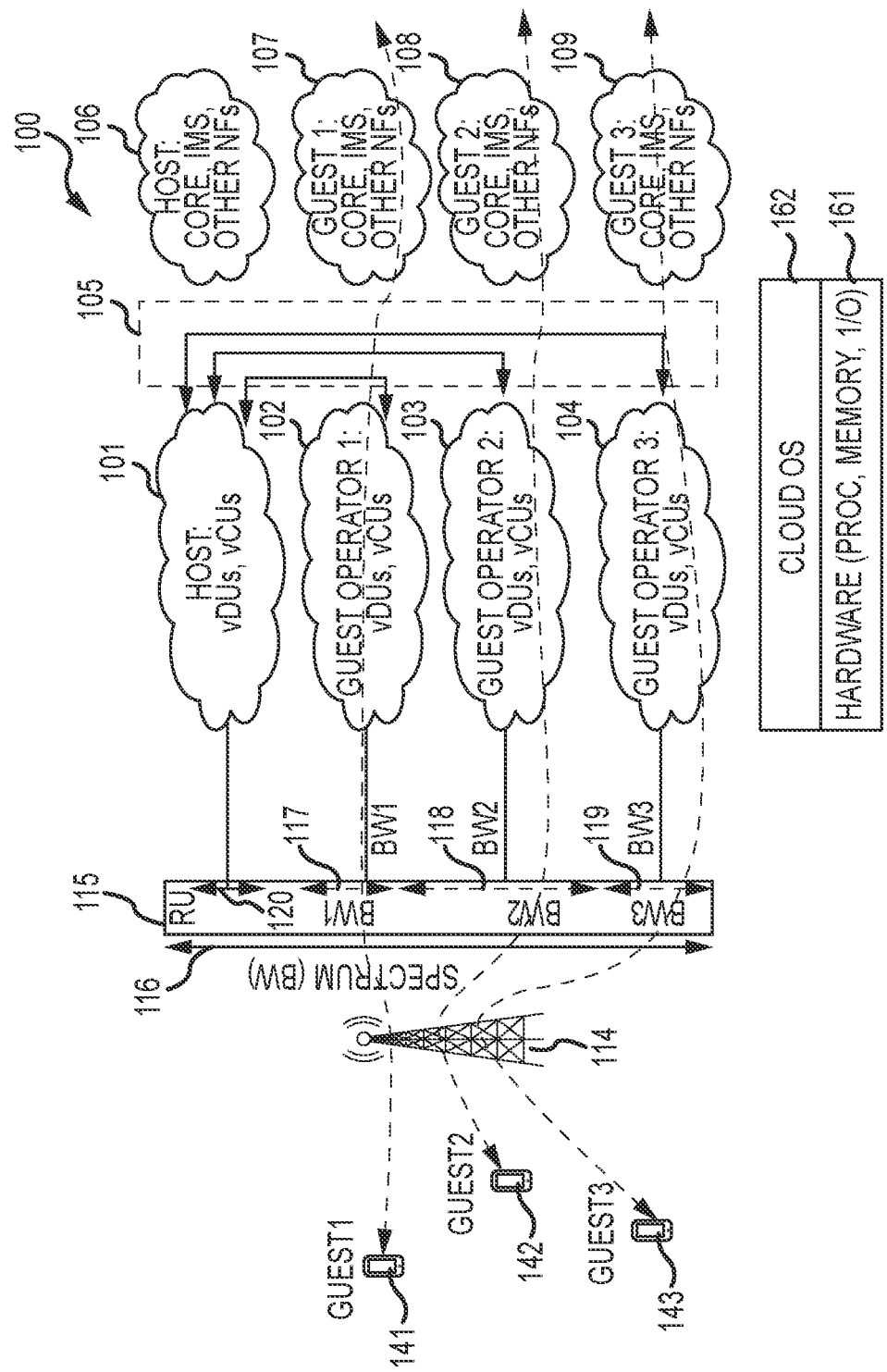
FIG. 1 illustrates an example of a cloud-based wireless network using virtualized network functions, in accordance with various embodiments.

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Systems, methods, and devices of the present disclosure automatically install patches on a cloud-based data and telephone network. According to various embodiments, a patch management system applies patches to computing resources on a cloud-based data and telephone network. The system compares a baseline to a desired patching state to identify uninstalled patches on cloud-based resources. A cron job or other automated process runs at predetermined maintenance windows to check the baseline for potential software updates and installs applicable patches on individual instances. The patching job may also be run manually in some embodiments, for example, to push critical updates before a maintenance window opens.

Tags are associated with the instances to enable filtering and selective patch application. Tags enable exemptions or flags for instances that will not receive certain patches. Instances running in different regions (e.g., availability zones) may be treated separately for patching. Each instance may have an associated agent, and the patching function (e.g., an AWS Lambda, a process, or other functional unit) detects active instances by polling the associated agents. The patching systems described herein tend to automatically roll out patches in a consistent and orderly manner with security policies set by a network operator. The patching systems described herein may also improve resilience of data and telephony networks by staggering maintenance windows for cloud-based network functions across availability zones.

Traditionally, data and telephone networks relied upon proprietary designs based upon very specialized hardware and dedicated point-to-point data connections. More recently, industry standards such as the Open Radio Access Network (Open RAN or O-RAN) standard have been developed to describe interactions between the network and various client devices. The O-RAN model follows a virtualized wireless architecture in which 5G base stations (gNBs) are implemented using separate centralized units (CUs), distributed units (DUs), and radio units (RUs), along with various control planes that provide additional network functions (e.g., 5G Core, IMS, and OSS/BSS/IT). Generally speaking, it is still necessary to implement the RUs with physical transmitters, antennas, and other hardware located onsite within broadcast range of the end user's device.

Other components of the network, however, can be implemented using a more centralized architecture based upon cloud-based computing resources, such as those available from Amazon® Web Services (AWS) or the like. This provides much better network management, scalability, reliability, and redundancy, as well as other benefits. O-RAN, CUs, DUs, control planes and/or other components of the network can now be implemented as software modules executed by distributed (e.g., "cloud") computing hardware. Other network functions such as access control, message routing, security, billing and the like can similarly be implemented using centralized cloud computing resources. Often, a CU, DU, control plane, or other image is created in software for execution by one or more virtual computers operating in parallel within the cloud environment. The many virtual servers can be very rapidly scaled to increase or decrease the available computing capacity as needed.

One challenge that does arise, however, involves patching the cloud-based resources of a rapidly evolving and dynamic network. Network components can be commissioned and decommissioned often in different geographic locations, and conditions can evolve very quickly in various parts of the network that trigger equally rapid decommissioning. Tracking the patch status of computing resources across a large-scale RAN network can be very difficult due to the scale of processing resources involved and the dynamic nature of such networks.

With reference now to FIG. 1, an example cellular communication system 100 is shown having virtualized network functions, in accordance with various embodiments. As used herein, the term network function may describe a functional building block within a network infrastructure. Network functions typically include well-defined external interfaces and a well-defined functional behavior. Network functions may be implemented in a cloud-based environment using virtualization tools such as, for example, virtual machines or containers. The systems described herein may thus spool up or retire network functions by launching a new instance or killing an existing instance of the network function.

In various embodiments, cellular communication system 100 includes a host operator maintaining ownership of one or more radio units (RUs) 115 associated with a wireless network cell. The example of FIG. 1 depicts a host operator operating a "radio/spectrum as a service (R/SaaS)" that allocates bandwidth on its own radio units for use by one or more guest network operators, though the systems, methods, and devices described herein could be applied to any wireless network using virtualized network services. Examples of guest network operators may include internal brands of the host operator, system integrators, enterprises, external mobile virtual network operators (MVNOs), or converged operators. The host and the guest network operators may maintain desired network services to support user equipment (UE) 141, 142, 143.

In the example of FIG. 1, each RU 115 communicates with UE 141, 142, 143 operating within a geographic area (e.g., a cell) using one or more antennas 114 (also referred to herein as towers) capable of transmitting and receiving messages within an assigned spectrum or bandwidth 116 of electromagnetic bandwidth. In various embodiments, guest networks 102, 103, 104 interact with a provisioning plane 105 to obtain desired spectrum (e.g., portions of bandwidth 117, 118, 119, 120, respectively) across one or more of the RUs 115 operated by the host 101. Provisioning plane 105 allows guest network operators to obtain or change their assigned bandwidths on different RUs 115 on an on-demand and dynamic basis. Network services 107, 108, 109 may be maintained by guest operators and network services 106 may be maintained by host 101. Network services are scaled up and down in response to network load, and patching of network services or any virtualization are applied as described herein.

The Open RAN standard breaks communications into three main domains: the RU that handles radio frequency (RF) and lower physical layer functions of the radio protocol stack, including beamforming; the DU that handles higher physical access layer, media access (MAC) layer and radio link control (RLC) functions; and the CU that performs higher level functions, including quality of service (QoS) routing and the like. The CU also supports packet data convergence protocol (PDCP), service data adaptation protocol (SDAP), and radio resource controller (RRC) functions. The RU, DU, and CU functions are described in more detail in the Open RAN standards, as updated from time to time, and may be modified as desired to implement the various functions and features described herein. In the example of FIG. 1, host 101 maintains one or more DUs and CUs (i.e., network functions) as part of its own network. The DU communicates with one or more RUs 115, as specified in the Open RAN standard.

The various network components shown in FIG. 1 are typically implemented using software or firmware instructions that are stored in a non-transitory data storage (e.g., a disk drive or solid-state memory) for execution by one or more processors. The various components shown in FIG. 1 can be implemented using cloud-based hardware 161 and an appropriate operating system 162 such as the AWS platform, although other embodiments could use other cloud platforms or any type of conventional physical computing hardware 161, as desired. In that regard, components of network 100 may be implemented using network functions, containers, virtual machines, or other virtualized implementations suitable for a cloud-based network.

As illustrated in the example of FIG. 1, system 100 includes a host network 101 and one or more guest networks 102, 103, 104. The host network 101 is typically operated by an organization that owns radio equipment and sufficient spectrum (potentially on different bands) to offer 5G capacity and coverage. Host network 101 provides 5G service to connected UEs, and it manages network services available to its own UEs or those of its guest operators. Host network 101 includes at least one DU and at least one CU, both of which will typically be implemented as virtual network functions using cloud resources.

Guest networks 102, 103, 104 operated by guest operators can manage their own networks using allocated portions of the bandwidth 116 handled by one or more of the RUs 115 associated with the host 101. The guest networks 102, 103, 104 communicate with one or more UEs 141-143 using allocated bandwidth 116 on the host's RU 115. Guest networks 102, 103, 104 may include one or more virtual DUs and CUs, as well as other network services 106, 107, 108, 109, as desired. Generally, one or more guest operators will instantiate its own 5G virtualized network functions (e.g., CMS, vCUs, vDUs, etc.) using cloud-based resources, as noted above. However, various embodiments may operate outside of cloud-based environments. Host network 101 may also generate its own network services to manage software and services available to UE 141-143.

Guest operators may lease or otherwise obtain any needed 5G access for its planned services, capacity, and coverage based on an arrangement with the host provider. A guest provider may then operate and manage its own 5G network 102, 103, 104 independently of the host 101 and the other guests. A network operator can optimize its own network by implementing its own cloud-based network services, which may also be patched using the patch management systems and techniques described herein.

Each RU 115 is typically associated with a different wireless cell that provides wireless data communications to user devices 141-143. RUs 115 may be implemented with radios, filters, amplifiers, and other telecommunications hardware to transmit digital data streams via one or more antennas 114. Generally, RU hardware includes one or more processors, non-transitory data storage (e.g., a hard drive or solid-state memory) and appropriate interfaces to perform the various functions described herein. RUs are physically located on-site with the transmitter/antenna 114, as appropriate. Conventional 5G networks may make use of any number of wireless cells spread across any geographic area, each with its own on-site RU 115.

RUs 115 support wireless communications with any number of user devices 141-143. UE 141-143 are often mobile phones or other portable devices that can move between different cells associated with the different RUs 115, although 5G networks are also widely expected to support home and office computing, industrial computing, robotics, Internet-of-Things (IoT), and many other devices. While the example illustrated in FIG. 1 shows one RU 115 for convenience, a practical implementation will typically have any number of virtualized RUs 115 that can each be individually configured to provide highly configurable geographic coverage for a host or guest network, if desired. Host 101 and guest operators 102, 103, 104 can automatically scale and manage patching on network services using the techniques described herein.

Figure 2:
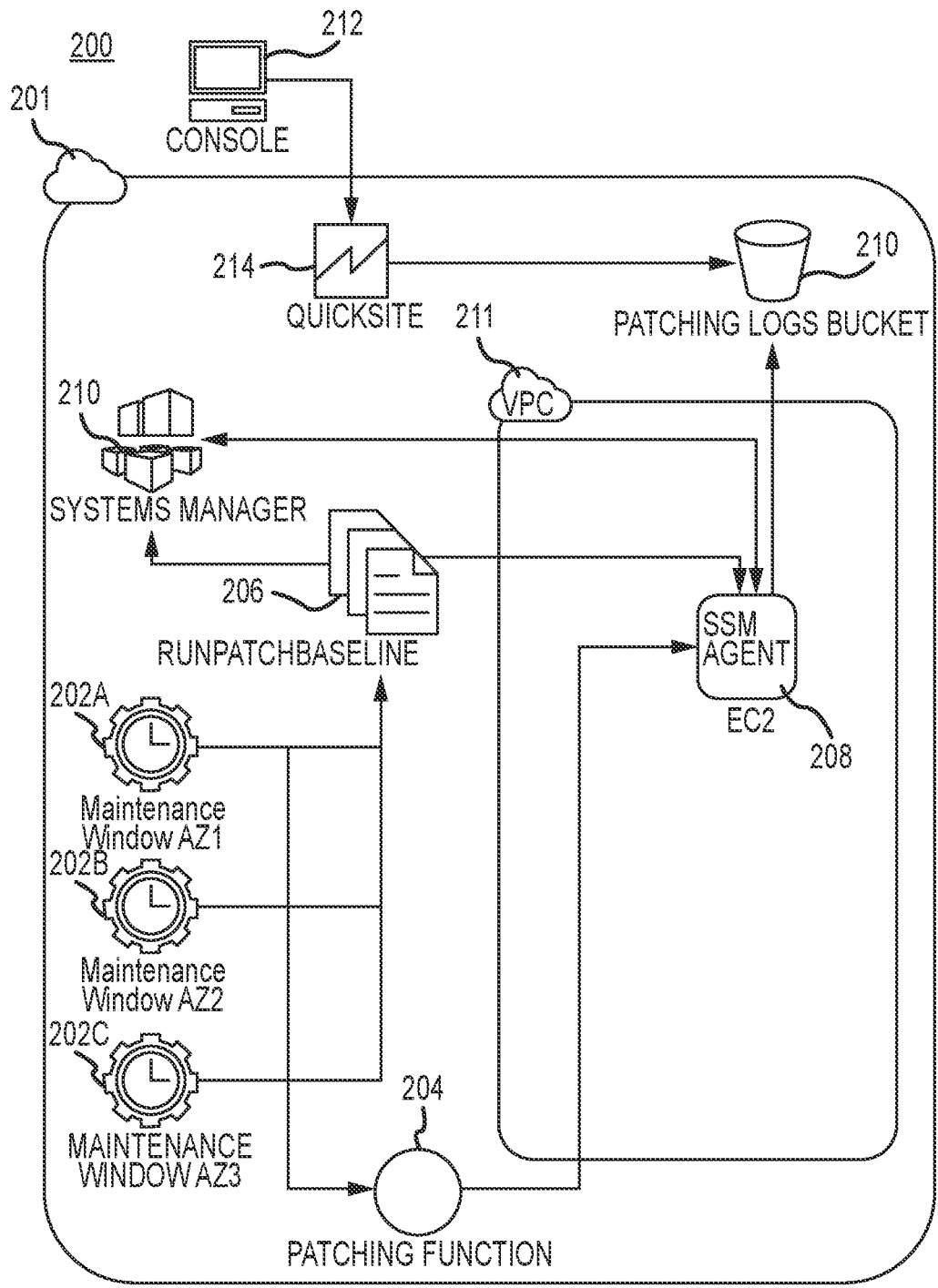
FIG. 2 illustrates an example architecture for a patching automation system to patch a network, in accordance with various embodiments.

Referring now to FIG. 2, an example system 200 for automated patching in cloud-based environment 201 is shown, in accordance with various embodiments. While the depicted example embodiment of FIG. 2 describes cloud-based environment 201 as using AWS cloud services and terminology such as SSM, lambda, and S3 as examples, other embodiments could equivalently run on other cloud platforms. System 200 may run on ServerSpace, Microsoft Azure, Google Cloud Platform, IBM Cloud Services, Kamatera, VMware, or any other cloud service provider. Cloud-based environment 201 could also be implemented as a private cloud.

In various embodiments, system 200 includes maintenance windows 202A, 202B, 202C each associated with an availability zone. In the depicted example, maintenance window 202A is associated with availability zone AZ1, maintenance window 202B is associated with availability zone AZ2, and maintenance window 202C is associated with availability zone AZ3. Maintenance windows may run at scheduled times or regular intervals. A maintenance widow may be launched from a cron job, for example. Maintenance windows 202 may be temporally staggered to limit the risk of outages that comes with patching all availability zones concurrently. Patching systems described herein may also operate without taking into consideration availability zones to streamline the patching process or expedite patch deployment in various embodiments.

Maintenance windows 202 launch patching function 204 at a predetermined time, according to various embodiments. Patching function 204 may be a service, process, thread, script, or other computing resource suitable for execution in response to an open maintenance window 202. In the depicted example, patching function 204 can be a lambda computing service hosted by AWS. Patching function 204 may query agents 208 running in an availability zone in response to a maintenance window 202 triggering the patching function. For example, patching function 204 may query agents 208 in AZ1 in response to maintenance window 202A launching patching function 204. In some embodiments, patching function 204 may be deployed automatically behind an application programming interface (API). Patching function may be launched using a rest API in some embodiments.

In the depicted example embodiment of FIG. 2, agent 208 may be a Systems Manager (SSM) agent that runs on cloud infrastructure 201. An agent 208 may be associated with each active instance 211 in cloud-based system 200. Patching function 204 may pole all active agents in the associated availability zone to assess which instances 211 are active or otherwise suitable for patching during the active maintenance window. Patching function 204 or another service supporting maintenance windows 202 may run patch baselines for all active target devices associated with the active availability zone. For example, patching function 204 may run a scan operation against the instances 211 or nodes associated with an agent 208 to retrieve a baseline. Patching agent 208 may compare the installed software on a node to the baseline retrieved using a scan function or script 206. A baseline may be a list of installed or installable software for a node, instance, container, virtual machine, or other computing resource along with version numbers or other metadata suitable for evaluating and applying patches. The SSM agent may install any patches that are identified on the applicable baseline but not present on the node.

Users can optionally interact with system 200 via console 212 through an interface 214. Interface 214 may be a dashboarding tool offered in native application or web application. In the depicted example, interface 214 can be the QuickSite tool available in support of AWS environments. Interface 214 may access patching logs 210 to convey patching status and results through interface 214. In the depicted example, patching logs 210 can be stored using a bucket.

Figure 3:
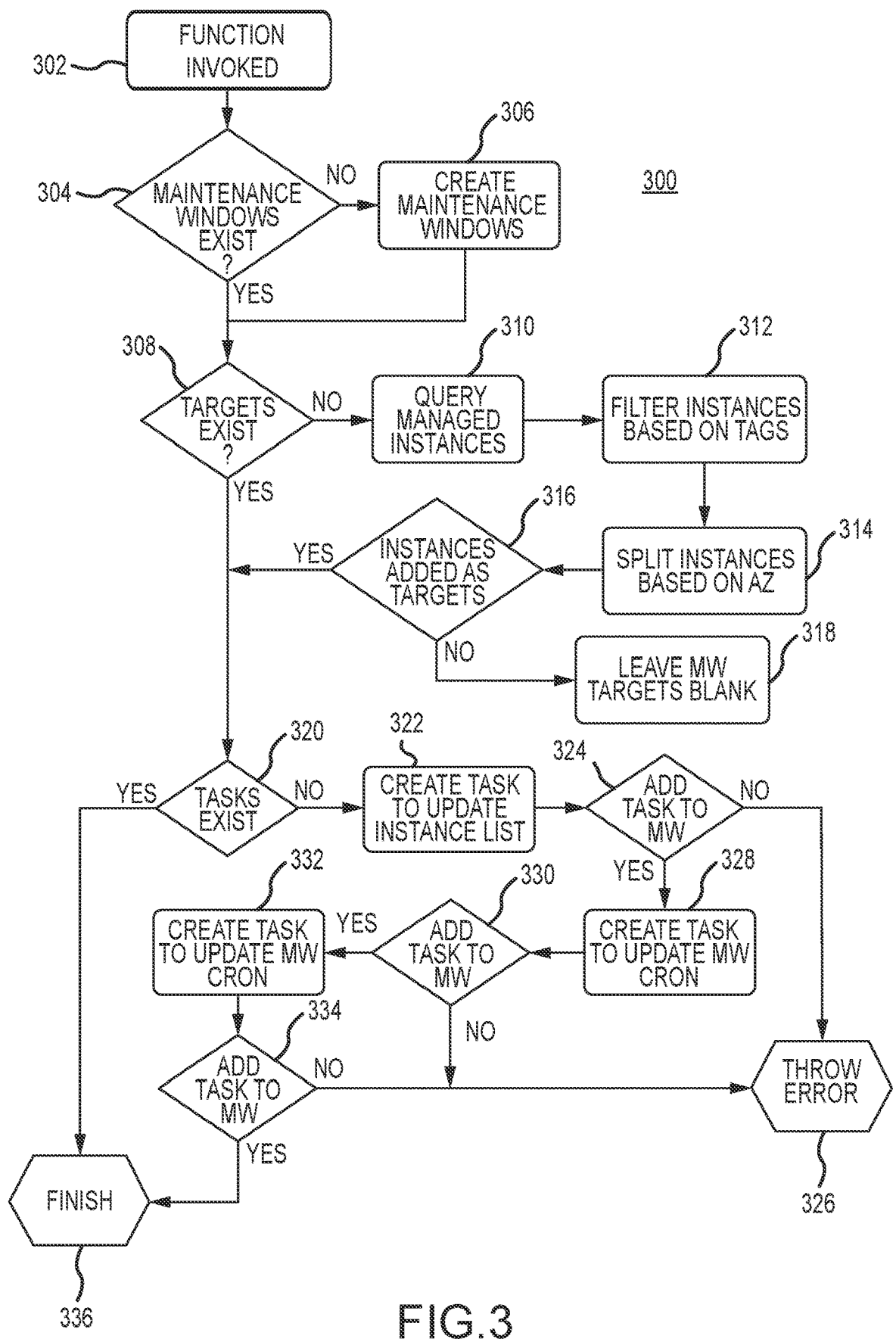
FIG. 3 illustrates an example of a process for execution by a patching automation system to patch a network, in accordance with various embodiments.

Referring now to FIG. 3, process 300 is shown for execution by patching function 204 to automatically deploy patches, in accordance with various embodiments. The various functions described in FIG. 3 may be performed by programmed logic (e.g., software or firmware) stored within memory and executed by processors, as appropriate. Other embodiments may perform additional functions or may organize the different functions in an equivalent but alternate manner.

Process 300 begins with launching or invoking patching function 204 by a maintenance window 202 (Step 302) in some embodiments, though in many embodiments patching function 204 can equivalently be launched from a command line or script executed by a user on console 212. Patching function 204 checks whether a maintenance window exists (Step 304). If no maintenance window exists, patching function 204 creates maintenance windows 202 (Step 306). If a maintenance window 202 does exist, patching system may check whether targets exist (Step 308). The maintenance windows may be associated with various availability zones or regions. The maintenance windows include a list of target instances 211 to receive patches during the maintenance window. For example, the list of target instances 211 for maintenance window 202A may include all instances 211 running in availability zone AZ1.

In various embodiments, patching function 204 queries agent 208 on instances 211 in response to the target list for a maintenance window being empty (Step 310). Patching function 204 may query for SSM managed instances 211 by polling for active SSM agents. In cloud environments other than the depicted example, other types of agents may be associated with instances 211 to facilitate detection and addition to a target list of agents to receive patching.

Patching function 204 filters instances 211 from the resulting set of targets based on tags indicating whether the tagged instance 211 should be excluded or patched (Step 312) in various embodiments. Tags may be manually or automatically generated and associated with instance 211. Tags can exclude instance 211 from a particular patch or software installation or tags can trigger a particular patch or software installation.

Various embodiments of patching function 204 split the filtered result set of target instances 211 based on the availability zone in which the instances 211 are running (Step 314). Instances 211 of the same network function or other virtualized system may be running in different availability zones. The instances 211 may be split into separate maintenance windows 202, each corresponding to a different availability zone. Splitting instances 211 that are patching targets into different maintenance windows 202 based on availability zone tends to reduce the risk of a system-wide outage as a result of patching. The split instances may be added to the target list associated with the maintenance window 202 for the availability zones in which the instances 211 operate. The patching function may add or remove targets from a target list associated with a maintenance window 202 even if the particular maintenance window 202 is not open or running at the time.

Patching function 204 checks whether instances 211 for each availability zone are added as targets to the maintenance window 202 associated with the availability zone (Step 316). Patching function 204 may leave the list of targets in a maintenance window 202 empty in response to no instances 211 being added as targets (Step 318). Once a maintenance window 202 has targets in its target list, patching function 204 checks whether tasks exist (Step 320) to update the instance list, to run the patching executable, or to update the cron job associated with a maintenance window 202. A task is created to update the instance list (Step 322) of a maintenance window 202 in response to the update task being undetected.

In various embodiments, patching function 204 checks whether the new task for updating the instance list was added to a maintenance window 202 (Step 324). The system may throw an error in response to failing to add the task to a maintenance window 202 (Step 326). Patching function 204 may create a task to run an executable (Step 328). In the depicted example, the executable may be a SSM document, though other embodiments could use a script, process, thread, program, or other piece of executable software to apply patches. The executable may apply patches or install software missing from each instance 211 in the target list. Missing software is detectable by comparing currently installed patches and software on instance 211 with the baseline of desired patches and software that should be installed on instance 211. Installed software may be compared to a baseline by comparing revision numbers or other software package identifiers from an installed list with the baseline list.

Patching function 204 may add the execution task created in step 328 to the maintenance window 202 (Step 330). Patching function 204 may throw an error in response to failing to add the execution task to the maintenance window 202 (Step 326). Patching function 204 may create a task to update the cron job that launches a maintenance window 202 at the scheduled time (Step 332). Patching function 204 attempts to add the cron update task to the maintenance window 202 (Step 334). An error is thrown in response to failing to add the cron update task to the maintenance window 202 (Step 326). In response to the task being successfully added to the maintenance window 202, patching function 204 may finish execution (Step 336). The created tasks or existing tasks run to push patches to target instances 211 and prepare the maintenance window 202 for its next scheduled launch.

Benefits, other advantages, and solutions to problems have been described herein with regard to specific embodiments. Furthermore, the connecting lines shown in the various figures contained herein are intended to represent exemplary functional relationships or couplings between the various elements. It should be noted that many alternative or additional functional relationships or connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used herein, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process for patching in a cloud-based environment, comprising:
   creating a first maintenance window for execution at a first scheduled time, wherein the first maintenance window comprises a first target list of instances running in a first availability zone;
   creating a second maintenance window for execution at a second scheduled time, wherein the second maintenance window comprises a second target list of instances running in a second availability zone;
   invoking a patching function in response to the first maintenance window running at the first scheduled time, wherein the patching function is configured to retrieve a set of target instances by querying managed instances in response to detecting that the first target list is empty; and
   creating, by the patching function, a task to run a patching executable to apply a patch to a first instance from the first target list during the first maintenance window.

2. The automated process of claim 1, further comprising:
   launching the patching function in response to the second maintenance window running at the second scheduled time; and
   creating, by the patching function, a second task to run a second patching executable to apply a second patch to a second instance from the second target list.

3. The automated process of claim 1, further comprising identifying the patch as missing from the first instance by comparing a list of installed patches on the first instance to a baseline associated with the first instance, wherein the patch is missing in response to being present on the baseline but absent from the list of installed patches.

4. The automated process of claim 1, further comprising creating, by the patching function, a second task to update the first target list of instances running in the first availability zone.

5. The automated process of claim 1, further comprising creating, by the patching function, a task to update a next launch time for the first maintenance window.

6. The automated process of claim 1, wherein the patching function creates the first maintenance window and the second maintenance window in response to the first maintenance window and the second maintenance window being undetected.

7. The automated process of claim 1, wherein the patching function filters the set of target instances based on tags associated with each instance in the set of target instances to generate a set of filtered instances.

8. The automated process of claim 7, wherein the patching function adds the set of filtered instances to the first target list in response to the set of filtered instances running in the first availability zone.

9. An automated process for patching in a cloud-based environment, comprising:
   creating a first maintenance window for execution at a first scheduled time, wherein the first maintenance window comprises a list of target instances;

querying a plurality of agents to identify a plurality of active instances;

filtering the active instances in response to tags associated with the active instances to identify a plurality of filtered instances;

adding the filtered instances to the list of target instances;

invoking a patching function in response to the first maintenance window running at the first scheduled time; and creating, by the patching function, a task to run a patching executable that applies a patch to a first instance from the list of target instances in response to the patch being undetected on the first instance.

10. The automated process of claim 9, further comprising:

launching the patching function in response to a second maintenance window running at a second scheduled time, wherein the second scheduled time is different from the first scheduled time; and creating, by the patching function, a second task to run a second patching executable to apply a missing patch to a second instance from a second target list.

11. The automated process of claim 9, wherein the patch is undetected on the first instance in response to appearing on a baseline associated with the first instance but not on a list of installed patches on the first instance.

12. The automated process of claim 9, further comprising creating, by the patching function, a task to update a next launch time for the first maintenance window.

13. The automated process of claim 9, wherein the patching function creates the first maintenance window and a second maintenance window in response to the first maintenance window and the second maintenance window being undetected.

14. The automated process of claim 9, wherein the patching function retrieves a set of target instances by querying managed instances in response to detecting that the list of target instances is empty.

15. The automated process of claim 14, wherein the patching function filters the set of target instances based on tags associated with each instance in the set of target instances to generate a set of filtered instances.

16. The automated process of claim 15, wherein the patching function adds the set of filtered instances to the list of target instances in response to the filtered instances running in a first availability zone.

17. An automated patching system for a cloud-based network, the automated patching system comprising:

an instance of a network function running on cloud-based hardware;

an agent associated with the instance and configured to retrieve a baseline for the instance and a list of installed software on the instance;

a patching function running on cloud-based hardware and in communication with the agent, wherein the patching function runs at a first scheduled time in response to a first maintenance window starting at the first scheduled time, wherein the first maintenance window comprises a first target list of instances running in a first availability zone, wherein the patching function runs at a second scheduled time in response to a second maintenance window starting at the second scheduled time, and wherein the patching function is configured to retrieve a set of target instances by querying managed instances in response to detecting that the first target list is empty; and a first task launched by the patching function to run a patching executable that applies a patch to the instance from the first target list during the first maintenance window, wherein the first task applies the patch in response to the patch being present on the baseline and absent from the list of installed software on the instance.

18. The automated patching system of claim 17, wherein the patching function launches in response to the second maintenance window running at the second scheduled time, and wherein the patching function creates a second task to run a second patching executable that applies a second patch to a second instance from a second target list of the second maintenance window.

19. The automated patching system of claim 17, wherein the patching function creates a second task to update the first target list of instances running in the first availability zone.

* * * * *